United States Patent
Allara et al.

(10) Patent No.: US 12,031,390 B2
(45) Date of Patent: Jul. 9, 2024

(54) ANTI-COLLISION SYSTEM AND METHOD

(71) Applicant: SAIPEM S.P.A., San Donato Milanese (IT)

(72) Inventors: Paolo Mario Alessandro Allara, San Donato Milanese (IT); Anna Sansone, San Donato Milanese (IT)

(73) Assignee: Saipem S.P.A., San Donato Milanese (IT)

( * ) Notice: Subject to any disclaimer, the term of this patent is extended or adjusted under 35 U.S.C. 154(b) by 765 days.

(21) Appl. No.: 17/055,246

(22) PCT Filed: May 9, 2019

(86) PCT No.: PCT/IB2019/053803
§ 371 (c)(1),
(2) Date: Nov. 13, 2020

(87) PCT Pub. No.: WO2019/220277
PCT Pub. Date: Nov. 21, 2019

(65) Prior Publication Data
US 2021/0207454 A1 Jul. 8, 2021

(30) Foreign Application Priority Data
May 15, 2018 (IT) .......................... 102018000005384

(51) Int. Cl.
*E21B 19/00* (2006.01)
*F16P 3/14* (2006.01)
(Continued)

(52) U.S. Cl.
CPC ............ *E21B 19/002* (2013.01); *F16P 3/147* (2013.01); *G01S 13/58* (2013.01); *G01S 13/93* (2013.01)

(58) Field of Classification Search
CPC .... E21B 19/002; E21B 41/0021; F16P 3/147; G01S 13/58; G01S 13/93; G01S 2013/468; G01S 13/881; G01S 13/42; G01S 13/878
See application file for complete search history.

(56) References Cited

U.S. PATENT DOCUMENTS 5,506,587 A * 4/1996 Lans ..................... G01S 5/0072
370/321
7,679,545 B2 3/2010 Rausch et al.
(Continued)

FOREIGN PATENT DOCUMENTS

| DE | 102013018799 A1 | 3/2015 |
| EP | 3112900 A1 | 1/2017 |
| WO | 2015121818 A2 | 8/2015 |

OTHER PUBLICATIONS

International Search Report for International Patent Application No. PCT/IB2019/053803, mailed Jul. 10, 2019, 3 pages.

*Primary Examiner* — Redhwan K Mawari
(74) *Attorney, Agent, or Firm* — Armstrong Teasdale LLP

(57) ABSTRACT

An anti-collision method includes storing information on a current position of at least one vehicle within a target work volume, scanning the target work volume by a radiofrequency radiation signal to detect the presence of at least one human operator within the target work volume, determining the current position of the at least one human operator within the target work volume, comparing the current position of the at least one human operator with the current position of the at least one vehicle, and, if the current position of the at least one human operator at least partially overlaps the current position of the at least one vehicle, activating at least one safety device.

20 Claims, 6 Drawing Sheets

(51) Int. Cl.
*G01S 13/58* (2006.01)
*G01S 13/93* (2020.01)

(56) References Cited

U.S. PATENT DOCUMENTS

| | | | |
|---|---|---|---|
| 8,386,067 B2* | 2/2013 | Krapf | G01S 13/04 |
| | | | 83/73 |
| 8,520,695 B1* | 8/2013 | Rubin | H04W 72/30 |
| | | | 370/445 |
| 8,618,963 B2 | 12/2013 | Yoshida | |
| 9,164,512 B2* | 10/2015 | Oobayashi | G05D 1/024 |
| 9,396,398 B2 | 7/2016 | Kozicz et al. | |
| 2008/0027647 A1* | 1/2008 | Ansell | G01S 13/933 |
| | | | 701/301 |
| 2008/0252422 A1 | 10/2008 | Dowla et al. | |
| 2010/0052945 A1* | 3/2010 | Breed | G01C 21/30 |
| | | | 340/903 |
| 2011/0009194 A1* | 1/2011 | Gabai | G06F 3/011 |
| | | | 463/36 |
| 2012/0025964 A1 | 2/2012 | Beggs et al. | |
| 2012/0028662 A1* | 2/2012 | Nagai | H04W 24/06 |
| | | | 455/500 |
| 2014/0309813 A1* | 10/2014 | Ricci | G06V 20/59 |
| | | | 701/1 |
| 2014/0309863 A1* | 10/2014 | Ricci | H04W 4/12 |
| | | | 701/36 |
| 2014/0310031 A1* | 10/2014 | Ricci | G06Q 30/0633 |
| | | | 705/5 |
| 2014/0338174 A1 | 11/2014 | Mikalsen | |
| 2016/0271796 A1* | 9/2016 | Babu | B25J 9/1664 |
| 2018/0072313 A1* | 3/2018 | Stenneth | G01S 17/89 |
| 2018/0297520 A1* | 10/2018 | Morimura | B60Q 9/008 |
| 2019/0346557 A1* | 11/2019 | Baba | G01S 13/931 |
| 2019/0354116 A1* | 11/2019 | Shomin | G05D 1/042 |
| 2020/0200892 A1* | 6/2020 | Rajab | G01S 13/753 |
| 2021/0295460 A1* | 9/2021 | Tamazato | G07C 5/008 |

* cited by examiner

ANTI-COLLISION SYSTEM AND METHOD

CROSS-REFERENCE TO RELATED APPLICATIONS

This application is a National Phase Application of PCT International Application No. PCT/IB2019/053803, having an International Filing Date of May 9, 2019 which claims the benefit of priority to Italian Application No. 102018000005384, filed May 15, 2018, each of which is hereby incorporated by reference in its entirety.

FIELD OF THE INVENTION

It is the object of the present invention an anti-collision method.

Furthermore, the present invention relates to an anti-collision assembly.

In particular, the present invention relates to an anti-collision method and assembly for the safety of human operators operating in automated industrial contexts.

The present invention also relates to a scanning and processing device for an anti-collision assembly.

The present invention is particularly suitable, but not uniquely intended for applications on offshore platforms.

BACKGROUND OF THE INVENTION

Generally, known offshore drilling means, such as, for example, hydrocarbon extraction platforms, support a plurality of automated machines with which human operators have to cooperate. For example, the drill string tripping operations, in which the individual drilling rods are added to, or removed from, the drill string at the level of the drill floor of the drilling means, are highly automated. The individual drilling rods are taken from the storage area, moved towards the assembling station, moved close and screwed to the drilling rod with iron roughnecks connected to robotic arms.

Document US-2014-0338174 describes an automated system consisting of a first machine designed to lift a threaded joint which will be screwed to the drill string, and a second machine designed to maintain the drill string suspended.

Despite the strong drive towards robotization, it is essential that specialized personnel supervise some operations which are carried out in confined spaces and with machines moving, even fast, as well as in the presence of suspended loads, which may represent conditions of potential danger for the safety of human operators.

In contexts of this type, the need to avoid the collision between human operators and machines is strongly felt.

Conventionally, the kinematics for moving automated machines or parts thereof are preset and therefore the actual displacements of the machines or of parts thereof are easily predictable by an electronic control system and in some cases the displacement of the machines is guided by rails or other guiding means. Currently, also for these reasons, on a large part of offshore drilling means, automated machine-machine anti-collision systems are in use, designed to avoid, or at least to limit to a minimum, unwanted clashes and interferences between two or more automated machines which interact or, on the contrary, which shall not interact in a same predetermined work volume.

Known machine-machine anti-collision systems comprise a plurality of sensors, installed on the machines and intended to determine the current position of the machines themselves in a set three-dimensional reference system, and at least one data processing unit which processes the information acquired by the sensors to calculate the predicted trajectories and the three-dimensional geometries for each machine involved.

Anti-collision systems have also been proposed capable of taking into account the presence of human operators interacting with the machines or acting in the work volume of the moving machines. Ideally, each machine should be capable of recognizing the operators in the environment and of locating them within a predetermined three-dimensional reference system so as to prevent situations of potential danger by implementing dedicated algorithms.

For example, document U.S. Pat. No. 9,396,398 discloses an optical system employing multifocal vision to acquire images of the work volume and process them so as to identify the presence of a human operator and construct a virtual three-dimensional geometry which circumscribes the body of the human operator him or herself and which is recognized by the electronic anti-collision system as an exclusion area for the machines themselves and/or parts thereof.

Although partially advantageous, this solution is extremely complex to apply, since the processing of the images acquired requires times relatively long and therefore incompatible with the need of the anti-collision system to provide a fast response, for example in conditions of emergency or of danger for the human operators.

Although it regards applications on vehicles, document DE-102013018799 shows an example of an apparatus which employs optical sensors to measure the distance of an item from the sensor itself by means of phase modulation. In particular, the item to be located is irradiated by means of a stationary light radiation and the wave reflected by the item is detected and processed by means of phase correlation methods to determine the distance of the item to be located from the sensor.

Although being satisfactory from some points of view, a solution of this type is intrinsically prone to disturbances which corrupt the signal reflected by the item to be located, for example, caused by unwanted echoes due to the presence of metal parts, resulting in a poor reliability. Particularly in offshore drilling applications, such a solution has the further disadvantage of providing poor or no penetration of the optical signal through sludge or other materials associated with the drilling and/or extraction of hydrocarbons from submerged deposits, which are often deposited on the garments of the human operators.

For example, document U.S. Pat. No. 8,618,963 shows a system for identifying human operators by means of the employment of helmets equipped with reflecting identification tags for a predetermined radiofrequency radiation in connection with a network of reading sensors and with a control unit.

Such a solution, however, is not at all free from drawbacks. In fact, such a system involves a high risk of false positives, i.e., the reading of non-existing items, or false negatives, i.e., the failure to read real items, caused by an inefficiency of the reading sensors due, for example, to the overload of signals to the network of sensors. Furthermore, commercial safety devices, such as helmets and the like, often require a particular authorization to be modified, for example, to affix such identification tag. In addition, in such a solution, the identification tags become a critical component for the safety of the human operators and therefore require frequent maintenance and replacement.

Methods for detecting human operators and/or machines by means of radar scanning technologies are also known. Electromagnetic waves, in the domain of radio waves or microwaves, are transmitted to irradiate a predetermined work volume and by virtue of the processing of the return radiation it is possible to calculate the distance of a certain target item from the source, the current angular position and the speed of such target item. From a constructive point of view, such systems conventionally use a single transducer, in which the transmitting and receiving antennas are integrated, and comprise a system for processing the reflected signals.

Known types of transmitting-receiving apparatuses based on Radar-Doppler technology comprise sensors which emit and receive continuous sinusoidal waves ("continuous waves" or "CWs") in a certain time interval to determine the distance of the item to be detected as a function of various parameters such as, for example, the bandwidth and the time of flight of the reflected wave.

In the context of machine-machine and human-machine anti-collision systems for applications on motor vehicles based on Radar techniques, document WO-2015-121818 shows a network of sensors installed on board vehicles in communication with active electronic devices ("responders") worn by human operators within the predetermined work volume and with a control unit. Furthermore, a solution based on the same type of Radar is shown in document U.S. Pat. No. 8,502,729.

Another type of anti-collision systems based on Radar technology is disclosed, for example, by document US-2008-0252422 which shows a system for the identification and traceability of items in a predetermined work volume based on Impulse Radar technology ("micropower impulse radar", or "MIR") combined with sensors, such as, for example, RFID. In particular, such document shows a passive diode sensor activated by a dual antenna radar interrogator which transmits a low-power impulse radar wave free of external disturbances since the impulse contains a wide range of frequencies. When activated by the impulse signal, the diode emits a return signal which is received by the interrogator and processed.

Furthermore, Radar devices for tracking and localizing moving human operators have been proposed, linked to the detection of low-frequency pulsator displacements due to the heartbeat or the respiratory cycle, which produce measurable phase changes in the reflected wave (so-called "subject tone" signal). An example of a well-known transportable device of this type is given by the "flashlight radar" developed at the Georgia Tech Research Institute which was specifically designed to allow the detection and localization of the presence of a human operator in a predetermined work volume even in the case in which a non-conductive barrier, such as, for example, a motor vehicle windscreen or a piece of furniture, is interposed between the human operator and the radiation transmitting-receiving device.

Although being advantageous from some points of view and particularly for applications in the field of road safety, a solution of this type has some drawbacks. For example, as reported in document U.S. Pat. No. 7,679,545, a problem of this technique is given by the disturbances caused by the displacements of the Radar transmitting device which may make the return subject tone signal unreadable.

However, the solutions described above are mainly based on the concept of the identification of human operators and remote control and are lacking in actively safeguarding the human operators. Furthermore, the effectiveness of such techniques is often limited by the malfunction of the identification tags. In addition, the installation of antennas and sensors on automated machines is often not allowed without the explicit authorization of the supplier of the machine.

The need is therefore strongly felt to obviate the drawbacks of the background art complained here above, and to provide an anti-collision system capable of predicting the risk of collision even between machines and human operators, without for this reason imposing the use of wearable devices on the operators themselves.

The need is also strongly felt to propose an anti-collision system adapted to recognize human operators within a predetermined work volume and to distinguish them unequivocally from the other items placed therein, such as, for example, the machines.

SUMMARY OF THE INVENTION

It is an object of the present invention to obviate the drawbacks of the background art and to propose a solution capable of meeting the aforementioned requirements with reference to the background art.

This and other objects are achieved by a method, a device, an assembly, an offshore platform and a factory as described and claimed herein.

Some advantageous embodiments are also described.

By virtue of the proposed solutions, it is possible to scan a predetermined work volume recognizing the presence of human operators or visitors, even if hidden behind barriers which are not electrically conductive or out of sight.

By virtue of the proposed solutions, it is possible to recognize the presence of human operators, even if temporarily stationary with respect to a predetermined reference system, without, for this reason, imposing the individual identification thereof.

By virtue of the proposed solutions, it is possible to foresee the operating kinematics of the moving machines within a predetermined work volume, without, for this reason, imposing the installation of antennas on such machines.

The present invention shows improved reliability with respect to solutions for applications on offshore drilling means, where the operating conditions impose the presence of sludge or other extraction materials as well as structures in metal and therefore reflecting certain wavelengths.

DETAILED DESCRIPTION

Figure 1:
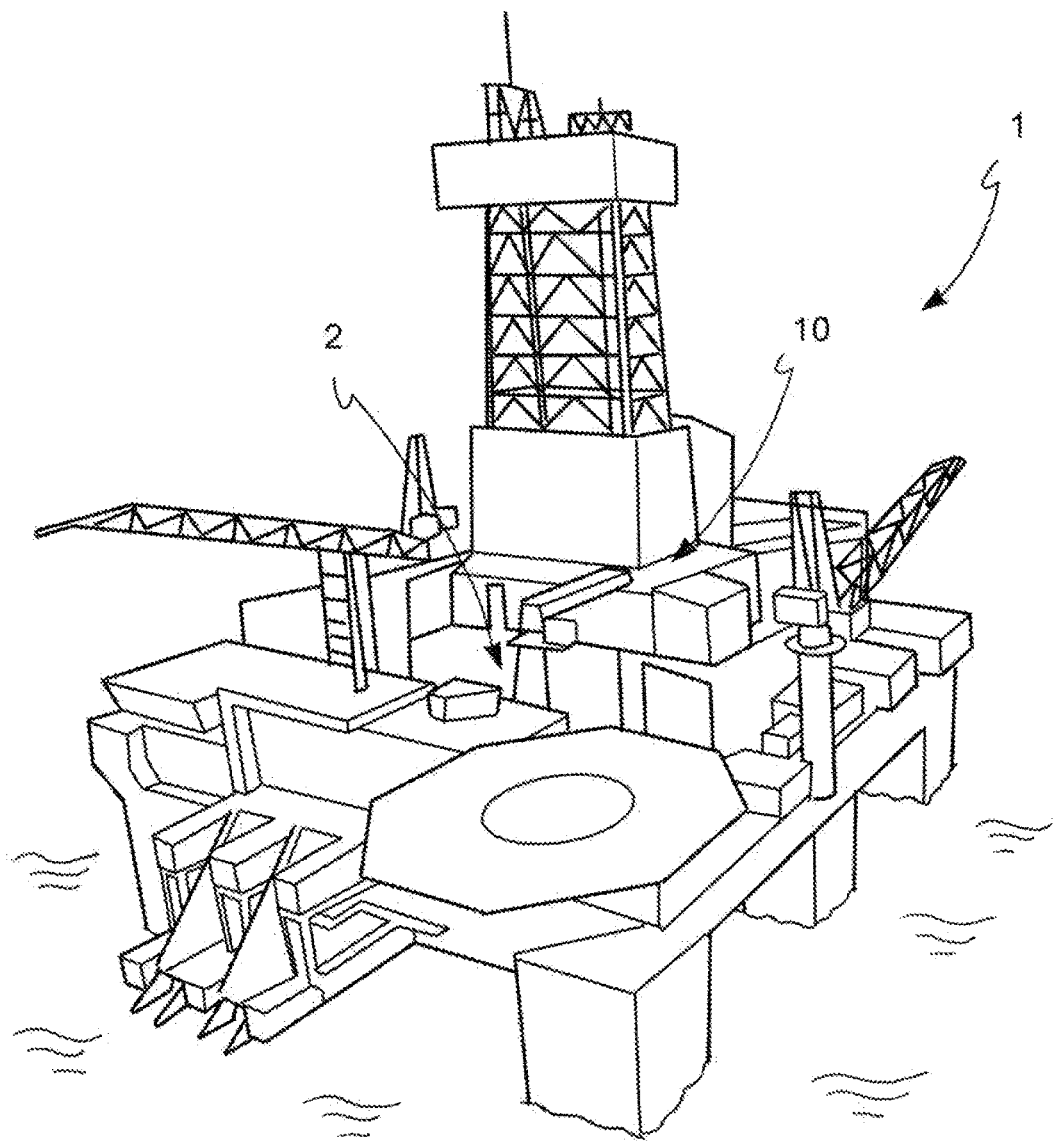
FIG. 1 shows an axonometric view of an offshore platform.
Figure 2:
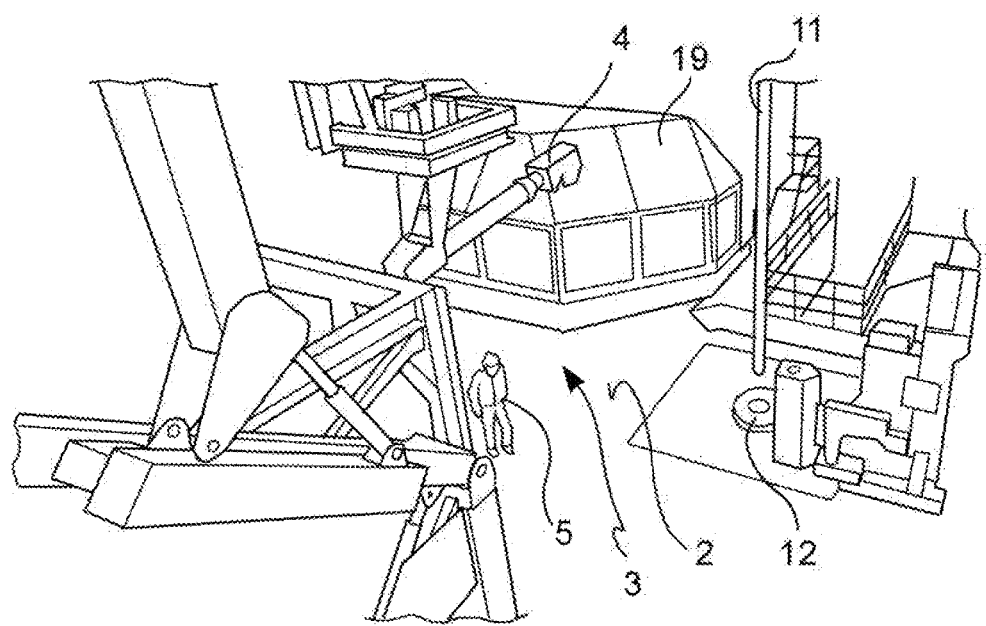
FIG. 2 shows an axonometric view of a work volume.
Figure 3:
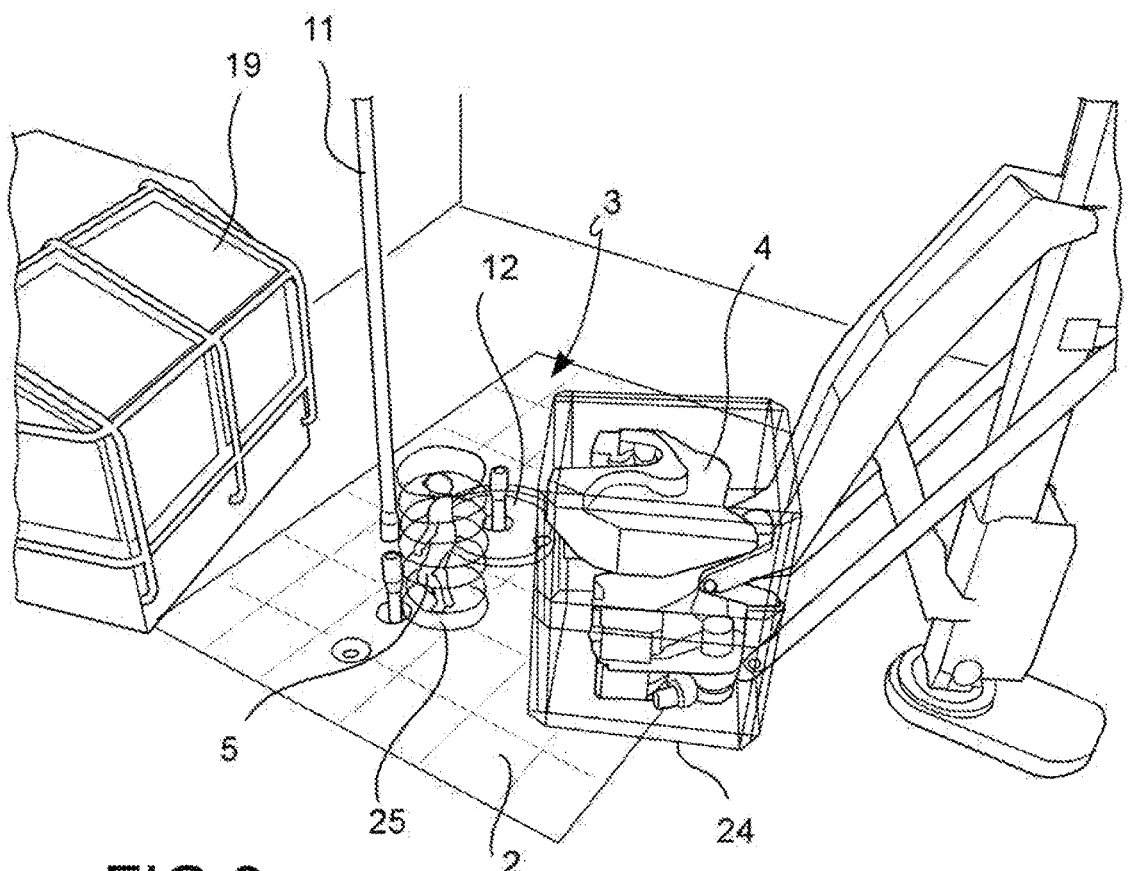
FIG. 3 shows an axonometric view of the work volume of FIG. 2, in which the first and second three-dimensional geometries detected by the anti-collision assembly are shown, according to a possible mode of operation.
Figure 4:
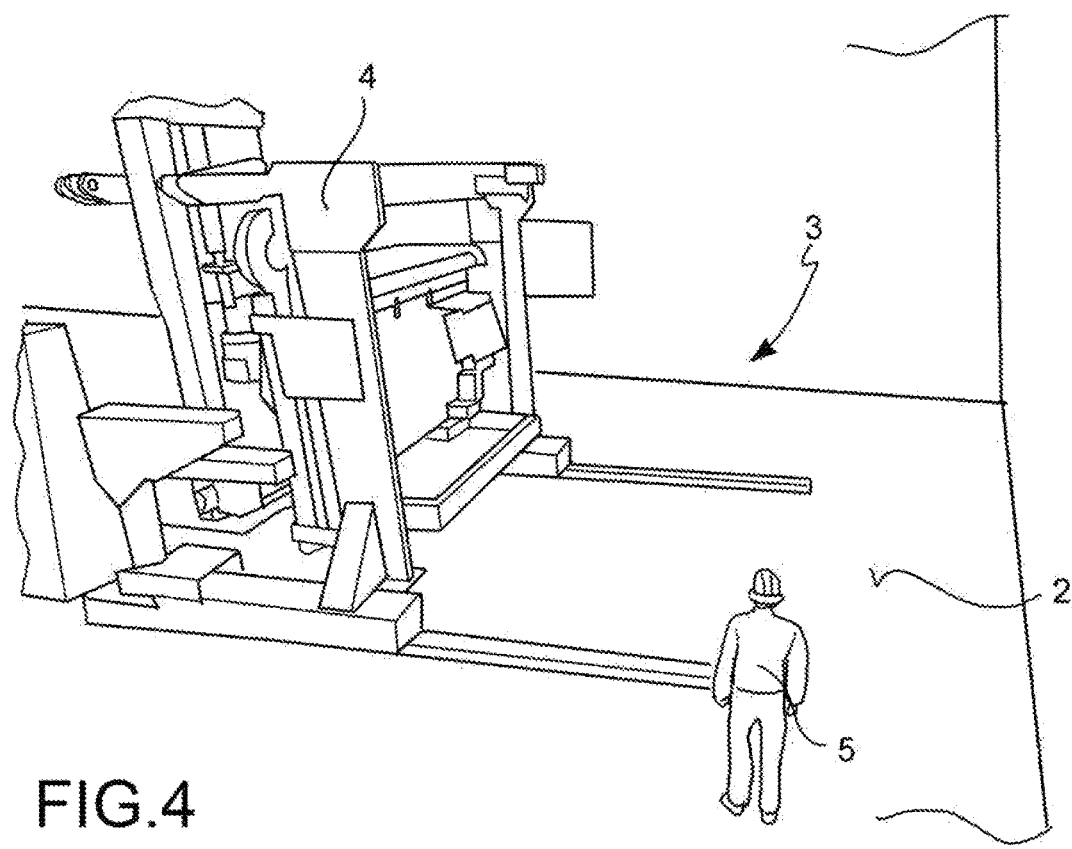
FIG. 4 shows an axonometric view of the work volume comprising a human operator and a vehicle, according to an embodiment.
Figure 5:
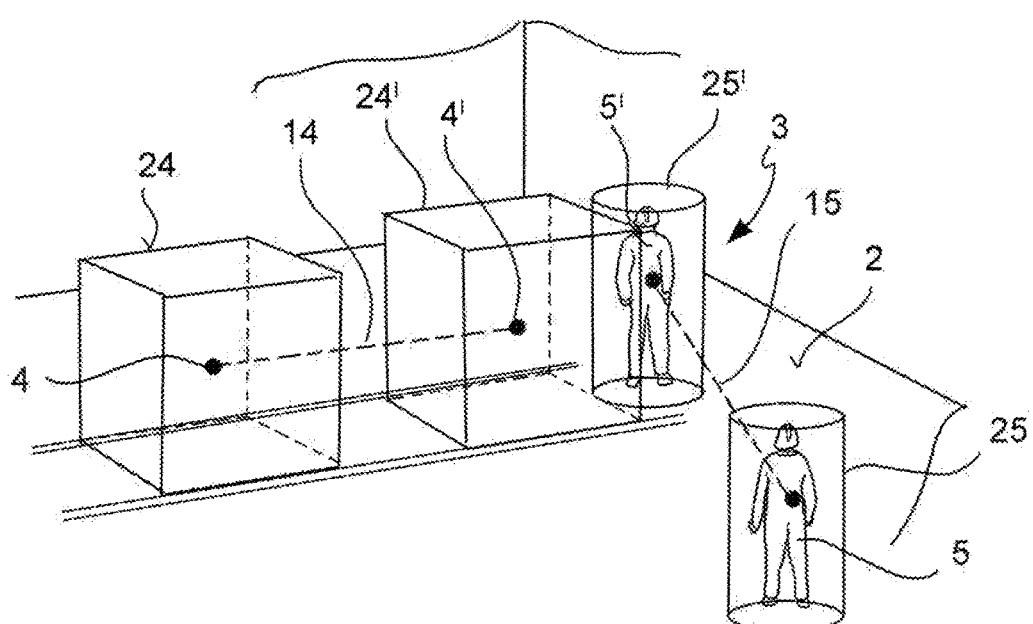
FIG. 5 shows a diagrammatic view of the work volume of FIG. 4, in which the three-dimensional geometries, the predicted trajectory of the vehicle and the expected trajectory of the human operator are shown, according to a possible mode of operation.
Figure 6:
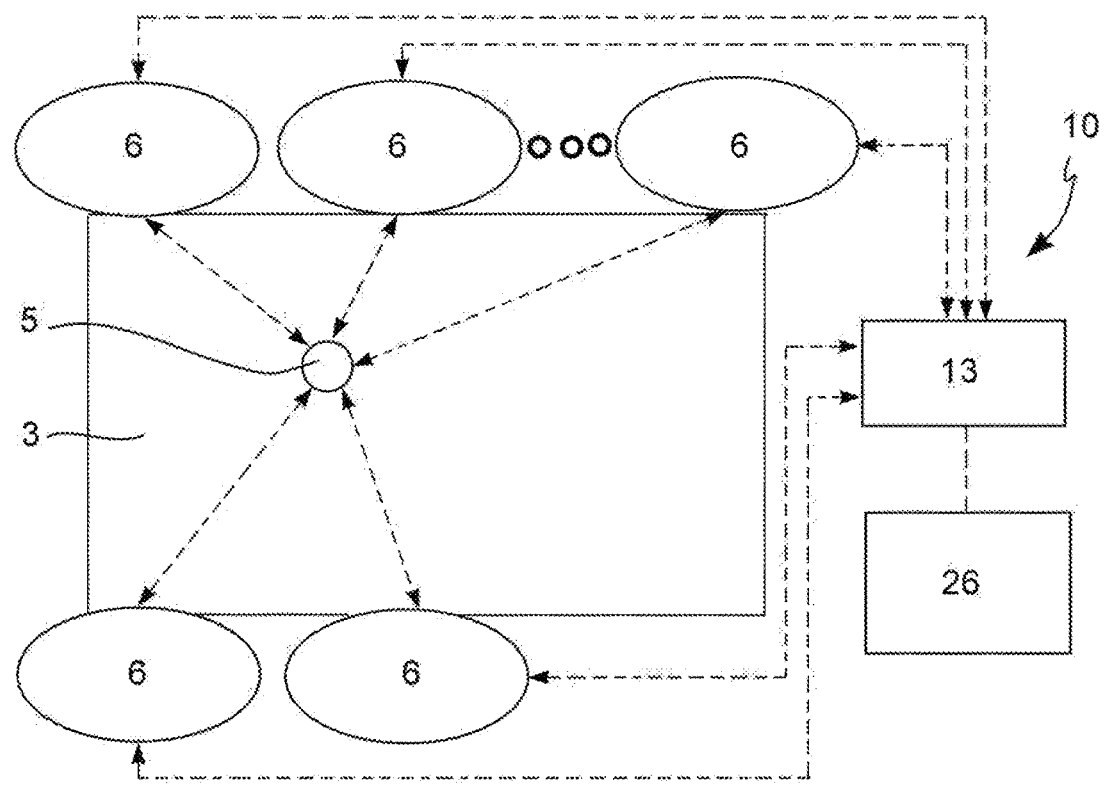
FIG. 6 shows a block diagram of the anti-collision assembly, according to an embodiment.
Figure 7:
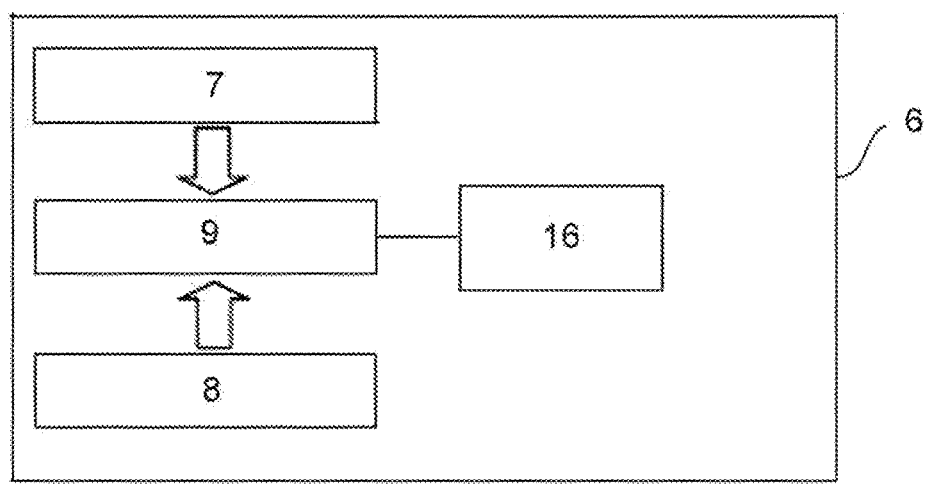
FIG. 7 shows a block diagram of a sensor node, according to an embodiment.
Figure 8:
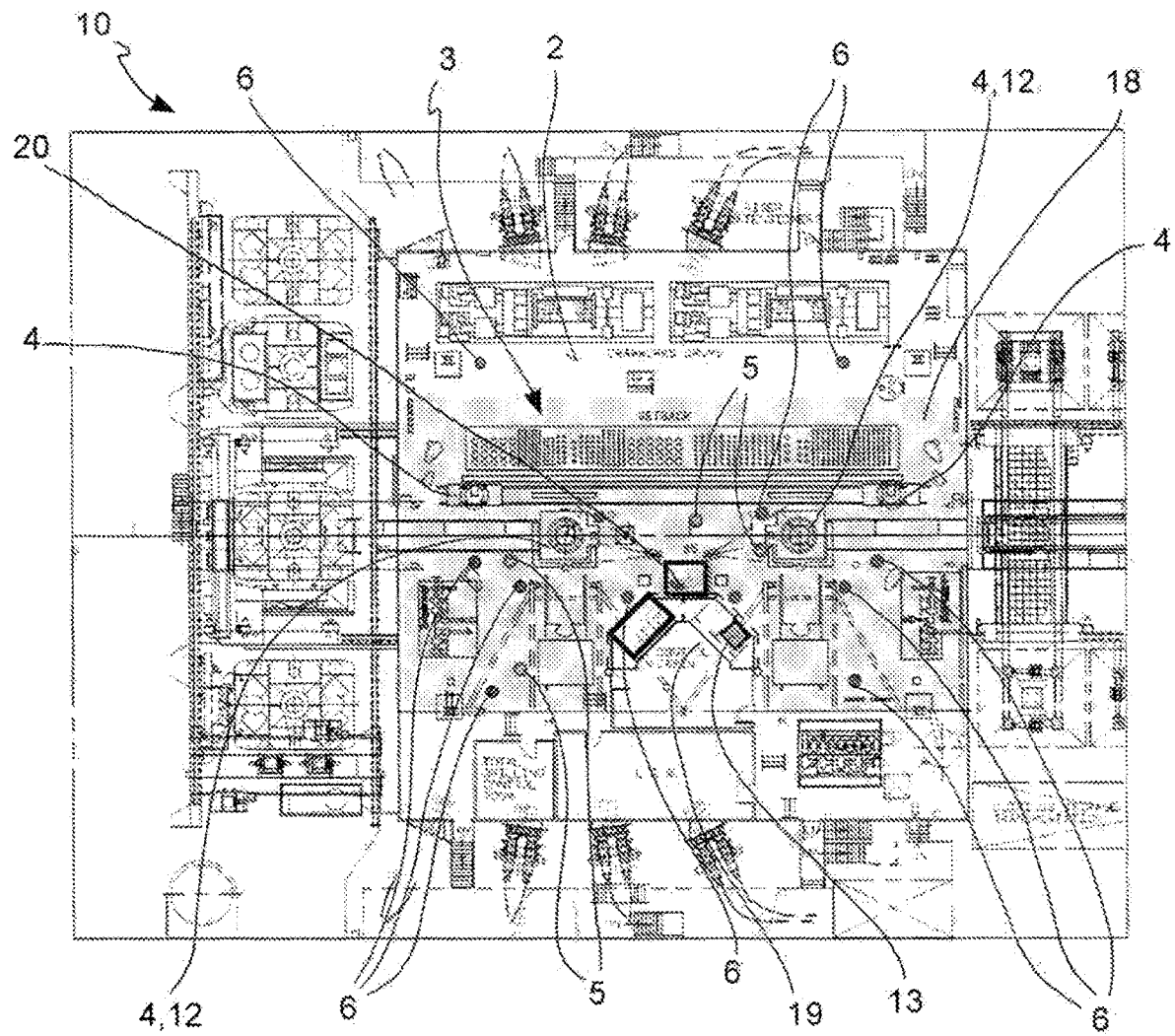
FIG. 8 shows a diagrammatic and top view of a drill floor of an offshore platform in which an anti-collision assembly is associated, according to an embodiment.
Figure 9:
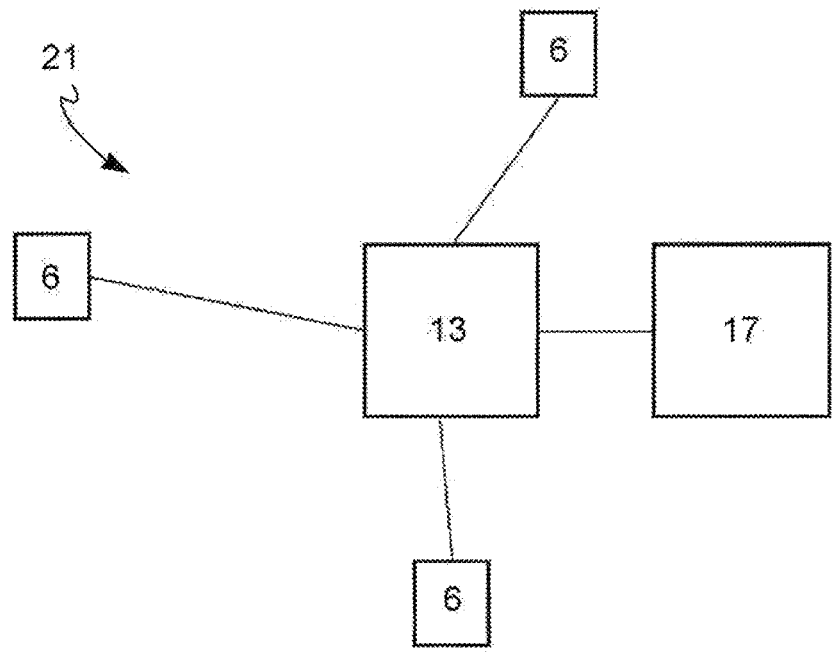
FIG. 9 shows a block diagram of a scanning and processing device, according to an embodiment.
Figure 10:
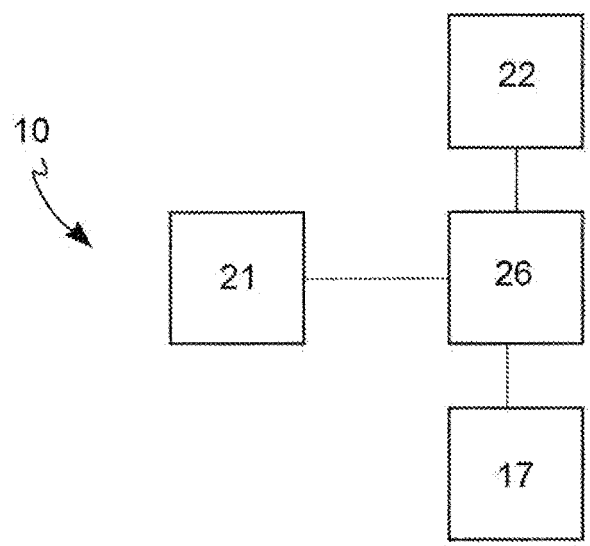
FIG. 10 shows a block diagram of an anti-collision assembly, according to an embodiment.

In accordance with a general embodiment, an anti-collision method is provided, adapted to prevent the accidental collision between at least one human operator 5 and at least one vehicle 4 within a target work volume 3.

The method is particularly suitable, but not uniquely intended for applications on offshore platforms 1, for example, platforms for the extraction of hydrocarbon.

The method comprises the step of storing information on at least the current position of at least one vehicle 4 within the target work volume 3.

In accordance with an embodiment, the method comprises the step of storing information on at least the predicted trajectory 14 of at least one vehicle 4 within a target work volume 3.

Thereby, information relating to the predicted trajectories 14 of the vehicles or of the mobile machinery within the target work volume 3 is available.

In accordance with a preferred mode of operation, the step of storing information on the predicted trajectory 14 comprises the step of storing information on the expected displacement speed of the at least one vehicle 4 or mobile machinery within the work volume 3.

The trajectory and the expected displacement speed of the at least one vehicle 4 within the target work volume 3 are vector quantities, i.e. comprising information also on the direction of the expected displacement speed, which are predetermined and/or preset and therefore known a priori.

In accordance with a possible mode of operation, the step of storing information on the current position of the at least one vehicle 4 is performed by storing information on the arrangement of one or more exclusion zones 18 within the target work volume 3.

Preferably, the term "one or more exclusion zones" means one or more areas defined in the target work volume 3, preferably on the drill floor 2 comprised within said target work volume 3, in which an operator may not enter. For example, said one or more exclusion zones 18 are surfaces defined on the drill floor 2.

In accordance with an embodiment, the terminology "one or more exclusion zones" means one or more portions of the target work volume 3 in which the access of the at least one human operator 5 is prohibited or forbidden, even if there is no danger of imminent collision with a vehicle 4 and even if such one or more exclusion zones do not correspond to the union of all the preset predicted trajectories 14 of all the vehicles 4 within the target work volume 3. For example, said one or more exclusion zones 18 are volumes which extend as vertical or sub-vertical projections from said one or more areas defined on the drill floor 2.

In accordance with a possible mode of operation, the storing step is performed by storing information on the arrangement of one or more exclusion zones 18 within the target work volume 3. In accordance with a possible mode of operation, the definition of said one or more exclusion zones 18 is performed by an operator. Thereby, the method comprises the step of comparing the current position of at least one human operator 5 with the area of the drill floor 2 circumscribed by the exclusion zone 18. For example, if the current position of the operator 5 coincides with at least one point of the exclusion zone 18, then the method comprises the step of activating an acoustic signal within the control room 19 to inform the operator that the limits for the access to the exclusion zone 18 have been exceeded.

The method comprises the step of scanning, by means of a radiofrequency radiation signal, a target work volume 3. Preferably, said radiofrequency radiation is a radar signal. In accordance with a preferred embodiment, said radiofrequency radiation comprises a continuous wave (CW) radar signal.

In accordance with a possible mode of operation, the scanning step is periodically repeated at regular or irregular time intervals defining a predetermined scanning frequency. In accordance with a possible mode of operation, the scanning step is performed by employing a plurality of receiving units 8 arranged in a predetermined three-dimensional space volume, preferably arranged near or within the target work volume 3.

Said target work volume 3 is adapted to receive at least one vehicle 4, for example, a mobile machinery 4 or a machine comprising at least one part movable by a predetermined displacement, such as, for example, an overhead crane, a trolley and the like. For example, said vehicle 4 may be movable with respect to the drill floor 2 by a translation displacement, for example, directed along a substantially horizontal direction. For example, said vehicle 4 may be movable with respect to the drill floor 2 by a rotation displacement, for example about the longitudinal axis thereof and/or about a generic rotation axis. For example, said vehicle 4 may be movable with respect to the drill floor 2 by a roto-translation displacement, for example entering or exiting the drill floor 2.

Said target work volume 3 is adapted to further receive at least one human operator 5. The human operator may be intended to cooperate with a vehicle 4, such as, for example, a mobile machinery. In accordance with a possible mode of operation, said target work volume 3 comprises the drill floor 2 of an oil platform 1.

By virtue of the scanning step, it is possible to detect the presence of at least one human operator 5 within the work volume 3.

In accordance with a possible mode of operation, it is possible to detect the presence of a human operator 5 by monitoring the vital signals of the human operator 5, such as the heartbeat, the respiratory reflex and similar vital signals which determine a phase modulation of the reflected echo signal.

The method comprises the further step of determining the position, in other words, the current position, of the at least one human operator 5 within the target work volume 3. In accordance with a possible mode of operation, the step of determining the current position is performed by triangulating the signals originating from a plurality of receiving units 8 preferably facing the target work volume 3. In accordance with a possible mode of operation, the step of determining the current position of the at least one human operator 5 within the work volume 3 is performed by employing a plurality of sensor nodes 6.

In accordance with a preferred mode of operation, the method comprises the further step of comparing the current position of the human operator 5 with the information on the current position of the at least one vehicle 4.

In accordance with a preferred mode of operation, if the current position of the at least one human operator 5 at least partially overlaps the current position of the at least one vehicle 4, then the method comprises the further step of activating at least one safety device.

Preferably, said safety device comprises at least one of the following: an acoustic signal to notify the human operator 5 of the risk of collision with the at least one vehicle 4 and/or a braking device intended to brake said vehicle 4 and/or a device for stopping the vehicle. For example, the braking device may be adapted to act as a device for stopping the vehicle. Thereby, the step of activating comprises the step of activating at least one of the following: an acoustic signal to promptly notify the human operator 5 of the risk of collision with the at least one vehicle 4 and/or a braking device intended to brake said vehicle 4.

By virtue of the activation of the acoustic signal, it is possible to promptly notify the human operator of the risk of collision with the at least one vehicle.

The provision of the braking device allows to brake the displacement of the vehicle, slowing it down or stopping it.

In accordance with a mode of operation, the method provides for activating the braking device only as an alternative to the activation of the acoustic signal. Preferably, the braking device is first activated to slow down the vehicle 4, and if the risk of collision persists, the braking device is activated to stop the vehicle 4.

In accordance with a mode of operation, the step of activating the safety device comprises the following substeps of:
  activating an acoustic signaling device to promptly notify the human operator 5 of the risk of collision with the at least one vehicle 4;
  repeating the scanning, determining and comparing steps and, if the current position of the at least one human operator 5 still at least partially overlaps the predicted trajectory 14 of the at least one vehicle 4, then activating a braking device intended to brake said vehicle 4.

In accordance with a mode of operation, the comparing step is performed by comparing the current position of the human operator 5 with the predicted trajectory 14 of the at least one vehicle 4.

Thereby, if the current position of the human operator at least partially overlaps, in other words, interferes with, the predicted trajectory of the at least one vehicle, then said method comprises the further step of activating said at least one safety device.

In accordance with a possible mode of operation, the method comprises the further step of associating the current position of the at least one human operator 5 to an instant in time, for example, the instant in time in which it was detected. Thereby, it is possible to estimate the expected displacement speed of the human operator. Thereby, it is possible to calculate the previous displacement speed of the human operator 5. The expected displacement speed of the human operator 5 is to be understood as a velocity vector comprising information of also the direction of the expected displacement speed of the human operator 5.

In accordance with a possible mode of operation, the method comprises the further steps of:
  comparing the current position of the human operator 5 with the predicted trajectory 14 of the at least one vehicle 4;
  if the current position of the human operator 5 at least partially overlaps the predicted trajectory 14 of the at least one vehicle 5, then calculating the time interval to the expected collision, i.e. the time lapse before the predicted trajectory 14 the at least one vehicle 4 overlaps the current position of the human operator 5;
  if the time interval to the expected collision is shorter than a predetermined threshold, then the method comprises the step of activating at least one safety device. Preferably, said safety device comprises at least one of the following: an acoustic signal and/or a braking device intended to brake said vehicle 4. Preferably, if the time interval to the expected collision is greater than the predetermined threshold, then the method comprises the step of not activating the safety device, in other words, of not activating at least one of the following: the acoustic signal and the step of not activating the braking device.

In accordance with a possible mode of operation, the method comprises the further steps of:
  estimating an expected trajectory 15 of the human operator 5, preferably on the basis of the estimate of the expected displacement speed of the human operator 5;
  comparing the expected trajectory 15 of the human operator 5 with the trajectory predicted 14 by the at least one vehicle 4;
  if the expected trajectory 15 of the human operator at least partially overlaps the predicted trajectory 14 of the at least one vehicle, then the method comprises the step of activating at least one safety device. Preferably, said safety device comprises at least one of the following: an acoustic signal and/or a braking device intended to brake said vehicle.

In accordance with a possible mode of operation, the method comprises the further step of calculating the time interval to the expected collision, so that, if the time interval to the expected collision is shorter than a predetermined threshold, then the method comprises said step of activating at least one safety device. Preferably, said safety device comprises at least one of the following: an acoustic signal and/or a braking device intended to brake said vehicle 4. Preferably, if the time interval to the expected collision is greater than the predetermined threshold, then the method provides the step of not activating the acoustic signal and the step of not activating the braking device.

In accordance with a possible mode of operation, the method provides the step of determining a three-dimensional vehicle geometry 24 or first three-dimensional geometry 24, preferably on a digital support, adapted to circumscribe the three-dimensional encumber or encumber of the vehicle 4. Preferably, this step is provided as a substep of the storing step or as a substep of the scanning step.

In accordance with a possible mode of operation, the scanning step comprises the step of determining a three-dimensional operator geometry 25 or second three-dimensional geometry 25, preferably on a digital support, adapted to circumscribe the three-dimensional encumber of the human operator 5.

By virtue of the determination of said first three-dimensional geometry 24 and of said second three-dimensional geometry 25, the method compares the relative current position and/or the relative trajectories and/or the speeds of said first three-dimensional geometry 24 and of said second three-dimensional geometry 25. In other words, the method reads said vehicle 4 and said at least one human operator 5 as a three-dimensional geometry 24, 25, preferably on a digital support. Thereby, it is possible to implement the method by employing at least one anti-collision assembly 10, as described below.

In accordance with a preferred embodiment, said first three-dimensional geometry 24 circumscribes the three-dimensional encumber of the vehicle 4, defining a convex bulk geometry which is greater than the three-dimensional encumber of the vehicle. Thereby, said first three-dimensional geometry 24 circumscribes the three-dimensional encumber of the vehicle 4 with a predetermined spatial tolerance or tolerance margin.

In accordance with a preferred embodiment, said second three-dimensional geometry 25 circumscribes the three-dimensional encumber of the human operator 5, defining a convex bulk geometry which is greater than the three-dimensional encumber of the human operator. Thereby, said second three-dimensional geometry 25 circumscribes the three-dimensional encumber of the human operator 5 with a predetermined spatial tolerance or tolerance margin.

In accordance with a possible mode of operation, the comparing step is performed by comparing the current position of the first three-dimensional geometry 24 with the current position of the second three-dimensional geometry 25. Thereby, if the current position of the second three-dimensional geometry 25 at least partially overlaps the current position of the first three-dimensional geometry 24, then the method comprises the further step of activating at least one safety device.

In accordance with a possible mode of operation, the comparing step is performed by comparing the predicted trajectory 14 of the at least one vehicle 4, preferably with the predicted trajectory of the first three-dimensional geometry 24, with the current position of the second three-dimensional geometry 25. Thereby, if the current position of the second three-dimensional geometry 25 at least partially overlaps the predicted trajectory 14 of the at least one vehicle 4, then the method comprises the further step of activating at least one safety device.

In accordance with a possible mode of operation, the step of associating the current position of the human operator 5 with an instant in time so as to estimate the expected displacement speed of the human operator 5, is performed by associating the current position of the second three-dimensional geometry 25 with an instant in time, so as to estimate the expected displacement speed of the human operator 5.

In accordance with a possible mode of operation, the step of estimating an expected trajectory 15 of the human operator 5 is performed by estimating the expected trajectory of the second three-dimensional geometry 25.

By virtue of the provision of associating said first three-dimensional geometry 24 with said vehicle 4 and said second three-dimensional geometry 25 with said human operator 5, said three-dimensional geometries 24, 25 are allowed to perform the steps of the method described above with reference to the human operator 5 and to the vehicle 4.

In accordance with a possible mode of operation, said three-dimensional geometries 24, 25 are enlarged with respect to the items they circumscribe, in other words, they are built so as to circumscribe the encumber of the vehicle and of the human operator, respectively, with a wide tolerance. Thereby, when the three-dimensional geometries 24, 25 are detected as being overlapping or compenetrated, the vehicle 4 and the human operator 5 are not in contact, even if the risk of imminent contact is high.

In accordance with a possible mode of operation, said three-dimensional geometries 24, 25 are convex. For example, said three-dimensional geometries 24, 25 define the three-dimensional convex envelope of the vehicle and of the human operator, respectively.

In accordance with a possible mode of operation, the method comprises the step of storing, preferably on a digital support, the predicted trajectory of at least one vehicle 4 as the trajectory of the first three-dimensional geometry 24 within the target work volume 3, thereby defining one or more exclusion zones 18 prohibited to the at least one human operator 5.

In accordance with an embodiment, said one or more exclusion zones 18 are portions of target work volume 3 to which the at least one human operator is forbidden access in any instant in time, for safety reasons.

In accordance with a possible mode of operation, when said method comprises the step of associating the current position of the human operator 5 with an instant in time so as to estimate the expected displacement speed of the human operator 5, then the step of storing the predicted trajectory 14 of the at least one vehicle 4 as the trajectory of the first three-dimensional geometry 24 within the target work volume 3 defines, in the target work volume 3, one or more exclusion volumes.

In accordance with a possible mode of operation, the definition of said one or more exclusion zones 18 is automatically performed by employing a plurality of control units 9.

In accordance with a possible mode of operation, the scanning step comprises the step of acquiring one or more images on a digital support of the work volume 3.

In accordance with a possible mode of operation, the method comprises, after the scanning step, the step of filtering said one or more images on a digital support of the work volume 3, so as to remove from said one or more images the items and the elements which are stationary within the work volume 3. Thereby, the processing of such one or more images will be faster and the efficiency of the anti-collision assembly 10 is improved.

In accordance with a possible mode of operation, the method comprises the further step of repeating the preceding steps starting from the scanning step. The scanning frequency may be constant or variable, and is chosen, for example, as a function of the estimated speed of the human operator 5 so as to obtain a satisfactory detection time resolution.

In accordance with a possible mode of operation, the method comprises the further step of providing an offshore platform 1 and of performing the steps of the method on such offshore platform 1, in which, preferably, the target work volume 3 substantially is the work volume at least partially surrounding the drill floor 2, and in which said at least one vehicle 4 or mobile machinery may be a rotary table, and/or a carriage for lifting and supporting a drilling rod 11 or a riser.

In accordance with a variant, the method comprises the further step of providing a factory and of performing the steps of the method in said factory, for example in an assembly line. The term "factory" means an industrial production context comprising automated machines.

In accordance with a general embodiment, a scanning and processing device 21 for an anti-collision assembly 10 is provided. Said anti-collision assembly 10 being adapted to prevent the accidental collision between at least one human operator 5 and at least one vehicle 4 within a target work volume 3.

Said scanning and processing device 21 comprises a detection device and at least one first processor 13.

In accordance with an embodiment, said detection device of the scanning and processing device 21 is adapted to scan a target work volume 3 by means of a radiofrequency radiation signal, so as to detect the presence of at least one human operator 5.

In accordance with an embodiment, said detection device of the scanning and processing device 21 comprises a plurality of sensor nodes 6, adapted to irradiate the target work volume 3 with the radiofrequency radiation signal.

In accordance with an embodiment, said first processor 13 is operatively connected to said detection device.

In accordance with an embodiment, said first processor 13 is adapted to acquire from said detection device information on the current position of the at least one human operator 5 and to process said information acquired to transmit it to a second processor 26 of the anti-collision assembly 10.

In accordance with an embodiment, said second processor 26 is adapted to cooperate with a memory 17 of the anti-collision assembly 10, said memory 17 of the anti-collision assembly 10 being adapted to store information on the current position of at least one vehicle 4 within a target work volume 3, so that said second processor 26 is adapted to cooperate with said memory 17 to compare the current position of the human operator 5 with the current position of the at least one vehicle 4.

In accordance with an embodiment, said second processor 26 of the anti-collision assembly 10 is adapted to cooperate with an actuating device 22 to transmit control signals to at least one safety device associable with the anti-collision assembly 10.

In accordance with an embodiment, said scanning and processing device 21 further comprises at least one memory 17, adapted to store information on the current position of at least one vehicle 4 within a target work volume 3. For example, said memory of the scanning and processing device is adapted to store information acquired by said memory 17 of the anti-collision assembly 10. Thereby, at least two memories are defined, which, for example may be integrated into a single memory.

In accordance with an embodiment, said first processor 13 is adapted to cooperate with said memory 17 to compare the current position of the human operator 5 with the current position of the at least one vehicle 4.

In accordance with an embodiment, said first processor 13 is adapted to transmit control signals to a safety device of the anti-collision assembly 10.

In accordance with an embodiment, said scanning and processing device comprises a plurality of sensor nodes 6, as described below in greater detail.

In accordance with a general embodiment, an anti-collision assembly 10 is provided.

Preferably, said anti-collision assembly 10 is adapted to perform the steps of the method described above.

Said anti-collision assembly 10 comprises a detection device, a first processor 13, a second processor 26, a memory 17 and an actuating device 22. In accordance with an embodiment, said first processor 13 and said second processor 26 are integrated to form a single data processing unit 13, 26.

Said memory 17 is adapted to store information on at least the predicted trajectory 14 of at least one vehicle 4 within a target work volume 3.

Said detection device is adapted to scan a target work volume 3 by means of a radiofrequency radiation signal, so as to detect the presence of at least one human operator.

In accordance with a preferred embodiment, said anti-collision assembly comprises at least one scanning and processing device 21 according to any of the embodiments described above.

In accordance with a preferred embodiment, said detection device comprises a plurality of sensor nodes 6, which may be variably arranged, to illuminate the target work volume 3 with the radiofrequency radiation.

In accordance with an embodiment, each sensor node 6 of said plurality of sensor nodes 6 comprises a transmitting unit 7, adapted to transmit the radiofrequency radiation towards said target work volume 3, and a receiving unit 8, adapted to detect the echo signals reflected by the items 4, 5 of the target work volume 3.

Preferably, each sensor node 6 further comprises a control unit 9 adapted to calculate the flight time elapsed between the transmission of the radiofrequency radiation and the reception of the reflected echo signal.

In accordance with a preferred embodiment, the transmitting unit of each sensor node 6 transmits a radiofrequency signal at a different instant in time with respect to the radiofrequency signal transmitted by the other sensor nodes 6 by means of respective transmitting units 7, so that such radiofrequency signals are out-of-phase and, consequently, the echo signals reflected by the human operator 5 are out-of-phase. Thereby, each sensor node 6 is allowed to recognize the reflected echo signal to be detected, avoiding detecting other reflected echo signals, for example, transmitted and therefore intended for the other sensor nodes 6 and/or reflected by other reflecting surfaces present in the target work volume 3.

In accordance with a preferred embodiment, each sensor node 6 is adapted to store information on the instant in time in which the radiofrequency radiation is transmitted.

By virtue of the provision of such sensor node 6 it is possible to reduce the noise of the reflected echo signal detected.

In accordance with an embodiment, each sensor node 6 is a radar transponder.

In accordance with a preferred embodiment, each sensor node 6 is configured to transmit, by means of the respective transmitting unit 7, a radar signal.

In accordance with an embodiment, each sensor node is configured to transmit, by means of the respective transmitting unit 7, a continuous wave and frequency modulated emission spectrum signal.

In accordance with an embodiment, each sensor node 6 is configured to receive, by means of the respective receiving unit 8, a signal which contains information on the presence of a human operator 5 in the target work volume 3.

In accordance with an embodiment, said assembly comprises at least three sensor nodes 6 not aligned with one another. Preferably, said assembly comprises at least five sensor nodes 6. In accordance with an embodiment, said assembly comprises a maximum of ten sensor nodes 6.

Preferably, said second processor 26 is adapted to acquire from said first processor 13 the processed information on the current position of the at least one human operator 5 and to compare the current position of the human operator 5 with the information acquired on the current position by the at least one vehicle 4.

Preferably, said second processor 26 is operatively connected, directly or indirectly, by means of said first processor 13, to said detection device and to said memory 17.

In accordance with an embodiment, said data processing unit is operatively connected to said detection device and to said memory 17. In accordance with an embodiment, said memory 17 is integrated with said data processing unit 13, 26.

Preferably, said data processing unit is adapted to detect the current position of the at least one human operator 5 and to compare the current position of the human operator 5 with the trajectory predicted 14 by the at least one vehicle 4.

Preferably, said data processing unit, and, preferably, said second processor 26, is adapted to calculate the time interval to the expected collision, in other words, the time interval to the instant in time in which a collision between the vehicle 4 and the human operator 5 is expected.

Preferably, said memory 17 comprises information on the value of the predetermined threshold, and the data processing unit, and preferably the second processor 26, is adapted to cooperate with the memory 17 to compare the time lapse before the expected collision with the predetermined threshold.

Preferably, said data processing unit 13, 26 is also adapted to estimate an expected trajectory 15 of the human operator, to compare the expected trajectory 15 of the human operator with the trajectory predicted 14 by the at least one vehicle 4, and to calculate the time interval to the expected collision.

In accordance with an embodiment, each sensor node 6 cooperates with said data processing unit, and, preferably, with said first processor 13, to detect on the reflected echo signal, by means of the respective receiving unit, the presence of a phase modulation typical of vital signals of a human operator 5, such as, for example, the reflection of the radiofrequency signal by the body of the human operator 5 comprising information on the heartbeat or on the respiratory reflex.

In accordance with an embodiment, each sensor node 6 cooperates with said data processing unit 13, 26, and preferably with said first processor 13, to reduce or eliminate the noise of the reflected echo signal.

By virtue of such a detection device, which cooperates with such a data processing unit, it is possible to obtain a mapping of the target work volume 3 comprising information on the current position of the at least one human operator 5.

Furthermore, by virtue of the provision of said memory 17, it is possible to obtain a mapping of the target work volume 3 comprising information on the current position of the at least one human operator 5 and on the predicted trajectory 14 of the at least one vehicle 4.

Preferably, said second processor 26 cooperates with said actuating device 22.

Preferably, said actuating device 22 is adapted to transmit control signals to at least one safety device.

In accordance with an embodiment, said actuating device is operatively connected to said data processing unit and is adapted to transmit control signals to said at least one safety device.

Preferably, said safety device comprises at least one of the following: a braking device associated with the vehicle and/or with a generator of acoustic signals. Thereby it is possible to perform the storing step.

In accordance with a preferred embodiment, said anti-collision assembly 10 is adapted to detect in real time the current position of the at least one human operator 5 in the target work volume 3.

In accordance with an embodiment, each sensor node 6 comprises at least one power supply battery 16 for the power supply of the respective sensor node. Thereby, it is possible to avoid the provision of power supply cables connected to each sensor node 6. Thereby, the current arrangement of the sensors in the target work volume 3 is determined by reasons of operating reliability, for example, scanning efficiency, avoiding to impose constraints due to the connection to the power supply cables.

In accordance with an embodiment, each sensor node 6 is operatively connected to the data processing unit, and preferably to the first processor 13, by means of a wireless connection. Preferably, the operating connection between each sensor node 6 and the data processing unit is modulated on a communication frequency which is comprised in a band different from the radar band, to avoid interferences with the reflected echo signals.

In accordance with an embodiment, said plurality of sensor nodes 6 are operatively connected to one another by means of a wireless connection.

In accordance with a preferred embodiment, said plurality of sensor nodes 6 faces said target work volume 3 and, preferably, at least some sensor nodes 6 of said plurality of sensor nodes 6 face said drill floor 2 of said offshore platform 1.

In accordance with an embodiment, said data processing unit is adapted to determine a first three-dimensional geometry 24, preferably on a digital support, which circumscribes the three-dimensional encumber of said vehicle 4.

In accordance with an embodiment, the scanning step comprises the step of determining a second three-dimensional geometry 25, preferably on a digital support, which circumscribes the three-dimensional encumber of the human operator 5.

In accordance with an embodiment, said memory 17 comprises information on the predicted trajectory 14 of at least one vehicle 4, stored as the trajectory of the first three-dimensional geometry 24 within the target work volume 3, thereby defining one or more exclusion zones 18 prohibited to the at least one human operator 5. In other words, said one or more exclusion zones are portions of target work volume 3 to which the at least one human operator is forbidden access in any instant in time, for safety reasons.

In accordance with an embodiment, said data processing unit defines said one or more exclusion zones 18.

In accordance with an embodiment, said assembly is adapted to identify the current position, in real time, of the hands of the at least one human operator 5 so as to prevent the collision between said vehicle 4 and the hands of the human operator 5.

In accordance with an embodiment, the anti-collision assembly 10 comprises a control room 19 comprising at least one display device adapted to show the information on the state of the anti-collision assembly 10 and/or of the sensor nodes 6 and/or of the at least one vehicle 4.

In accordance with an embodiment, said anti-collision assembly 10 further comprises a wireless router 20 operatively connected to each sensor node 6.

For example, in accordance with an embodiment, said anti-collision assembly 10 comprises a plurality of sensor nodes 6, located within the target work volume 3; at least one human operator 5 and a vehicle 4; a data processing unit, located within the control room 19 adapted to receive the data collected by the sensor nodes 6 and process them, and to store information on the position and/or occupied three-dimensional geometry and/or predicted trajectory of the vehicles 4; an interface console within the control room 19 by means of which the operator is capable of defining the limits of at least one exclusion zone 18 and by means of which the operator is capable of detecting the status of the sensor nodes 6 and of any active alarms; a wireless router 20 for the communication between the sensor nodes 6 and between the sensor nodes 6 and the processing unit.

For example, in accordance with an embodiment, each sensor node 6 communicates with the other sensor nodes and with the data processing unit by means of a wireless connection managed by a wireless router 20.

Preferably, the operating connection between each sensor node 6 and the data processing unit is modulated on a communication frequency which is comprised in a band different from the radar band, to avoid interferences with the reflected echo signals.

For example, in accordance with a possible mode of operation, the method comprises the step of identifying reflected signals to be eliminated since they are not related to the at least one human operator 5 in the working volume 3. These signals to be removed comprise at least the signals reflected by the items which are fixed within the work volume 3 and which remain constant over time given a static background, and those indirectly reflected by the human operator 5, i.e., those signals reflected by the body of the human operator 5 and which in turn are reflected by the surrounding obstacles before reaching the receiving units 8 of the sensor nodes 6.

For example, in accordance with a possible mode of operation, the method comprises the step of filtering the static background and the step of filtering the indirect signals reflected by the body of the at least one operator 5 within the working volume 3 so as to exclusively isolate the echoes reflected by the operators.

For example, in accordance with an embodiment, the data processing unit is equipped with a memory to allow the storage of information on the position and/or trajectory and/or three-dimensional geometry occupied by at least one vehicle 4 within the target work volume 3.

For example, in accordance with an embodiment, said data processing unit is further adapted to process the signals received by the sensor nodes 6 and to calculate the current position of the at least one human operator 5, the estimated trajectory 15 thereof and the three-dimensional geometry 25 thereof, so as compare them with the position, trajectory 14 and three-dimensional geometry 24 of the at least one vehicle 4.

For example, in accordance with an embodiment, said data processing unit is also adapted to calculate the time interval to the expected collision between the vehicle 4 and the human operator 5. For example, in accordance with an embodiment, said data processing unit is adapted to detect, on the reflected echo signal received by the sensor nodes 6 by means of the respective receiving unit, the presence of a phase modulation typical of vital signals of a human operator 5, such as, for example, the reflection of the radiofrequency signal by the body of the human operator 5 comprising information on the heartbeat or the respiratory reflex, so that these vital signals are used both to better identify the moving human operators and to avoid that the method filters by means of the "subtraction of the static background" also the signals reflected by the operators which are temporarily stationary.

For example, in accordance with an embodiment, the first processor 13 is further interfaced with the second processor 26 of a pre-existing anti-collision system, for example, of the vehicle-vehicle type, for example pre-existing on a drilling means, so as to exchange data relating to the current position and to the three-dimensional geometries 24 occupied by the at least one vehicle, when moving 4.

For example, in accordance with an embodiment, the data processing unit is also provided to be adapted to transmit safety signals to the control unit of the pre-existing anti-collision system, for example of the vehicle-vehicle type.

For example, in accordance with a possible mode of operation, the steps of scanning the working volume 3, of transmitting and processing the reflected echoes, of filtering the data and of subsequently calculating the position, three-dimensional geometry 25 and estimated trajectory of at least one human operator, are followed by a step of sending the data thus calculated directly to the processing unit 26 of the pre-existing anti-collision system.

For example, in accordance with an embodiment, the human operator is therefore integrated within the pre-existing vehicle-vehicle anti-collision system and the management of any human-machine collision is therefore directly performed by the control unit. For example, in accordance with an embodiment, if a collision is foreseen, then the control unit proceeds to activate at least one safety signal.

In accordance with a general embodiment, an offshore platform 1 is provided, comprising an anti-collision assembly 10 according to any of the embodiments described above.

Preferably, said offshore platform 1 comprises a drill floor 2 which is adapted to receive at least one vehicle 4 and at least one human operator 5 when in operating conditions.

In accordance with a general embodiment, a factory is provided, comprising an anti-collision assembly 10 according to any of the embodiments described above.

By virtue of the features described above, provided jointly or separately from one another in particular embodiments as well as in particular modes of operation, it is possible to meet the aforementioned needs by producing the aforementioned advantages, and in particular:

- the risk of accidental collision between movable machines and human operators is reduced, without, for this reason, imposing the individual identification of the human operator;
- it is possible for a human operator to operate safely within a predetermined work volume;
- it is possible to detect the current position of a human operator, using it to calculate whether a collision with at least one vehicle is foreseen;
- it is possible to detect the current position and the speed of a human operator, using them to calculate whether and when a collision with at least one vehicle is foreseen;
- it is possible to estimate the expected trajectory of a human operator using it to calculate whether and when a collision with at least one vehicle is foreseen;
- it is possible for a human operator to operate safely by means of the acoustic signaling of the risk of foreseen collision;
- it is possible to distinguish the presence of a human operator from the presence of a machine, as well as to identify the position thereof, while allowing the data processing unit to manage the current position and the expected trajectory of the human operator as if it were a machine, so as to allow comparing the data of the current position and of the expected trajectory of the human operator with the data of the current position and of the predicted trajectory of the vehicle or machine.

A person skilled in the art, in order to satisfy contingent and specific needs, may modify, adapt and replace numerous elements of the embodiments described above with other functionally equivalent, without however departing from the scope of the following claims.

REFERENCE LIST

1 Offshore platform
2 Drill floor of the offshore platform
3 Target work volume
4 Vehicle or mobile machinery
5 Human operator
6 Sensor node 7 Transmitting unit of the sensor node
8 Receiving unit of the sensor node
9 Control unit of the sensor node
10 Anti-collision assembly
11 Drilling rod
12 Rotary table
13 First processor
14 Predicted trajectory of the vehicle
15 Expected trajectory of the human operator
16 Power supply battery
17 Memory
18 Exclusion zone
19 Control room
20 Wireless router
21 Scanning and processing device
22 Actuating device
24 First three-dimensional geometry
25 Second three-dimensional geometry
26 Second processor

What is claimed is:

1. An anti-collision method for preventing an accidental collision between at least one human operator and at least one vehicle within a target work volume, the anti-collision method comprising the following steps:
storing information on a current position of the at least one vehicle within the target work volume;
scanning the target work volume by a radiofrequency radiation signal to detect a presence of the at least one human operator within the target work volume;
determining a current position of the at least one human operator within the target work volume;
comparing the current position of the at least one human operator with the information on the current position of the at least one vehicle,
if the current position of the at least one human operator at least partially overlaps the current position of the at least one vehicle,
the anti-collision method further comprises a step of activating at least one safety device,
wherein
the step of determining the current position of the at least one human operator within the target work volume is performed by:
avoiding using an identification tag on said at least one human operator,
employing a plurality of sensor nodes, arranged to illuminate the target work volume with radiofrequency radiation, wherein each sensor node of said plurality of sensor nodes comprises a transmitting unit and a receiving unit, wherein the transmitting unit of each of the plurality of sensor nodes is configured to transmit a respective radiofrequency signal at a different instant in time relative to the radiofrequency signals transmitted by each other sensor node, and wherein the receiving unit of each of the plurality sensor nodes is configured to detect reflected echo signals that have been reflected by the at least one vehicle and the at least one human operator within the target work volume,
receiving by a respective receiving unit for each sensor node of said plurality of sensor nodes a signal containing information on the presence of the at least one human operator in the target work volume;
triangulating signals originating from a plurality of receiving units facing the target work volume; and
with cooperation of each sensor node of said plurality of sensor nodes with a first processor, detecting on at least one reflected echo signal, by the respective receiving unit, presence of a phase modulation typical of vital signals of the at least one human operator.

2. The anti-collision method of claim 1, wherein the storing step comprises a step of storing information on an arrangement of one or more exclusion zones within the target work volume, wherein said one or more exclusion zones are areas or portions defined in the target work volume not accessible to the at least one human operator.

3. The anti-collision method of claim 1, further comprising a step of:
storing information on a predicted trajectory of the at least one vehicle within the target work volume;
and wherein
the comparing step is performed by comparing the current position of the at least one human operator with information acquired on the predicted trajectory of the at least one vehicle,
and wherein
if the current position of the at least one human operator at least partially overlaps the predicted trajectory of the at least one vehicle,
the anti-collision method further comprises a step of activating at least one safety device.

4. The anti-collision method of claim 1, further comprising a step of associating the current position of the at least one human operator with an instant in time to estimate an expected displacement speed of the at least one human operator.

5. The anti-collision method of claim 4, wherein the anti-collision method, before the activating step, further comprises the step of:
calculating a time interval to an expected collision;
if the time interval to the expected collision is shorter than a predetermined threshold, the anti-collision method comprises said activating step.

6. The anti-collision method of claim 4, further comprising the following steps:
estimating an expected trajectory of the at least one human operator;
comparing the expected trajectory of the at least one human operator with the predicted trajectory of the at least one vehicle;
if the expected trajectory of the at least one human operator at least partially overlaps the predicted trajectory of the at least one vehicle, the anti-collision method comprises said activating step.

7. The anti-collision method of claim 6, further comprising, before the activating step, a step of calculating the time interval to an expected collision, so that, if the time interval to the expected collision is shorter than a predetermined threshold, then the anti-collision method comprises said activating step.

8. The anti-collision method of claim 1, further comprising a step of determining a first three-dimensional geometry, adapted to circumscribe a three-dimensional encumber of the at least one vehicle, wherein the step of determining the first three-dimensional geometry is provided as a sub-step of the storing step or as a sub-step of the scanning step; and wherein
the scanning step further comprises a step of determining a second three-dimensional geometry, adapted to circumscribe a three-dimensional encumber of the at least one human operator; and wherein
the comparing step is performed by comparing a current position of the first three-dimensional geometry with information on a current position of the second three-dimensional geometry and/or by comparing the predicted trajectory of the at least one vehicle, with a predicted trajectory of the first three-dimensional geometry, with information on the current position of the second three-dimensional geometry.

9. The anti-collision method of claim 8, further comprising a step of storing the predicted trajectory of the at least one vehicle as the predicted trajectory of the first three-dimensional geometry within the target work volume, thereby defining one or more exclusion zones prohibited to the at least one human operator, wherein said one or more exclusion zones are areas or portions defined in the target work volume not accessible to the at least one human operator; and wherein
when said anti-collision method comprises a step of associating the current position of the at least one human operator with an instant in time to estimate the expected displacement speed of the at least one human operator, the step of storing the predicted trajectory of the at least one vehicle as the predicted trajectory of the first three-dimensional geometry within the target work volume defines one or more dynamic exclusion zones; and/or wherein
the anti-collision method further comprises a step of repeating the preceding steps starting from the scanning step; and wherein
the anti-collision method further comprises a step of storing information on the expected displacement speed of the at least one vehicle within the target work volume; and wherein
the scanning step is periodically repeated at regular or irregular time intervals defining a predetermined scanning frequency.

10. The anti-collision method of claim 1, wherein:
the scanning step is performed by the first processor;
also the comparing step is performed by said first processor;
the storing, determining and activating steps are performed by a second processor;
also the comparing step is performed by said second processor;
said first processor and said second processor are operatively connected to one another; and
said first processor is adapted to transmit information to said second processor.

11. The anti-collision method of claim 1, wherein the step of activating the at least one safety device comprises the following sub-steps:
activating an acoustic signaling device to promptly notify the at least one human operator of a risk of collision with the at least one vehicle;
repeating the scanning, determining and comparing steps and, if the current position of the at least one human operator still at least partially overlaps the predicted trajectory of the at least one vehicle, activating a braking device to brake said at least one vehicle.

12. The anti-collision method of claim 1, further comprising the steps of:
providing an offshore platform and performing the steps of the anti-collision method on said offshore platform; wherein
the target work volume is substantially a work volume at least partially surrounding a drill floor, and wherein said at least one vehicle is at least one of a rotary table or a carriage for lifting and supporting a drilling rod or riser;
or wherein:
the anti-collision method further comprises the steps of providing a factory and performing the steps of the anti-collision method in said factory.

13. A scanning and processing device for an anti-collision assembly, said anti-collision assembly being adapted to prevent an accidental collision between at least one human operator and at least one vehicle within a target work volume, the scanning and processing device comprising:
a detection device,
a first processor,
wherein:
said detection device is adapted to scan the target work volume by a radiofrequency radiation signal, to detect a presence of the at least one human operator;
said detection device comprises a plurality of sensor nodes, adapted to illuminate the target work volume with the radiofrequency radiation signal;
said first processor is operatively connected to said detection device;
said first processor is adapted to acquire from said detection device information on a current position of the at least one human operator and to process acquired information to transmit it to a second processor of the anti-collision assembly,
said second processor being adapted to cooperate with a memory of the anti-collision assembly,
said memory of the anti-collision assembly being adapted to store information on a current position of the at least one vehicle within the target work volume, so that said second processor is adapted to cooperate with said memory of the anti-collision assembly to compare the current position of the at least one human operator with the current position of the at least one vehicle;
said second processor of the anti-collision assembly being adapted to cooperate with an actuating device to transmit control signals to at least one safety device associable with the anti-collision assembly;
wherein
each sensor node of said plurality of sensor nodes comprises a transmitting unit, adapted to transmit radiofrequency radiation towards said target work volume, and a receiving unit, adapted to detect echo signals reflected by the at least one vehicle and the at least one human operator within the target work volume; said scanning and processing device comprises means for triangulating signals originating from a plurality of receiving units, wherein the transmitting unit of each sensor node of said plurality of sensor nodes transmits a respective radiofrequency signal at a different instant in time with respect to radiofrequency signals transmitted by the other sensor nodes, wherein said radiofrequency signals are out-of-phase and the echo signals reflected by the at least one human operator are out-of-phase, and
each sensor node of said plurality of sensor nodes cooperates with said first processor to detect on a reflected echo signal, by a respective receiving unit, presence of a phase modulation typical of vital signals of the at least one human operator.

14. The scanning and processing device of claim 13, further comprising at least one memory, adapted to store information on the current position of the at least one vehicle within the target work volume, said at least one memory of the scanning and processing device being adapted to store information acquired by said memory of the anti-collision assembly; wherein said first processor is adapted to cooperate with said memory of the anti-collision assembly to compare the current position of the at least one human operator with the current position of the at least one vehicle;

said first processor is adapted to transmit control signals to said at least one safety device; and/or wherein each sensor node of said plurality of sensor nodes cooperates with said first processor to detect on the reflected echo signal, by the respective receiving unit, the presence of a phase modulation typical of vital signals of the at least one human operator, to obtain a mapping of the target work volume comprising information on the current position of the at least one human operator; and/or wherein each sensor node of said plurality of sensor nodes further comprises a control unit adapted to calculate flight time elapsed between transmission of radiofrequency radiation and reception of the reflected echo signal.

15. An anti-collision assembly comprising:
at least one scanning and processing device comprising:
 a detection device,
 a first processor,
 wherein
  said detection device is adapted to scan a target work volume by a radiofrequency radiation signal, to detect a presence of at least one human operator;
  said detection device comprises a plurality of sensor nodes, adapted to illuminate the target work volume with the radiofrequency radiation signal;
  said first processor is operatively connected to said detection device;
  said first processor is adapted to acquire from said detection device information on a current position of the at least one human operator and to process the acquired information,
  each sensor node of said plurality of sensor nodes comprises a transmitting unit, adapted to transmit radiofrequency radiation towards said target work volume, and a receiving unit, adapted to detect echo signals reflected by at least one vehicle and the at least one human operator within the target work volume, wherein the transmitting unit of each sensor node of said plurality of sensor nodes transmits a respective radiofrequency signal at a different instant in time with respect to radiofrequency signals transmitted by the other sensor nodes, wherein said radiofrequency signals are out-of-phase and the echo signals reflected by the at least one human operator are out-of-phase;
  said scanning and processing device comprises means for triangulating signals originating from a plurality of receiving units, and
  each sensor node of said plurality of sensor nodes cooperates with said first processor to detect on a reflected echo signal, by a respective receiving unit, presence of a phase modulation typical of vital signals of the at least one human operator,
 a memory;
 an actuating device; and
 a second processor;
 wherein:
  said memory is adapted to store information on a current position of the at least one vehicle within the target work volume;
  said second processor is adapted to acquire from said first processor the processed information on the current position of the at least one human operator and to compare the current position of the at least one human operator with information acquired on the current position of the at least one vehicle;
  said second processor is operatively connected, directly or indirectly, by said first processor, to said detection device and to said memory;
  said second processor cooperates with said actuating device;
  said actuating device is adapted to transmit control signals to the at least one safety device.

16. The anti-collision assembly of claim 15, wherein said first processor and said second processor are integrated with one another into a single data processing unit.

17. The anti-collision assembly of claim 15, wherein:
 said memory is adapted to store information on a predicted trajectory of the at least one vehicle within the target work volume; and
 said second processor is adapted to compare the current position of the at least one human operator with information acquired on the predicted trajectory by the at least one vehicle.

18. The anti-collision assembly of claim 15, wherein:
 said second processor is adapted to calculate a time interval to an expected collision;
 said second processor is adapted to estimate an expected trajectory of the at least one human operator, to compare the expected trajectory of the at least one human operator with the predicted trajectory of the at least one vehicle, and to calculate the time interval to the expected collision;
 said second processor is adapted to cooperate with said memory to compare time before the expected collision with a predetermined threshold; and/or wherein
 said anti-collision assembly is adapted to perform the steps of an anti-collision method; and/or wherein
 each sensor node is a radar transponder; and wherein
 each sensor node is adapted to store information on an instant in time in which the radiofrequency radiation is transmitted; and wherein
 each sensor node is configured to transmit, by a respective transmitting unit, a radar signal and/or a continuous wave and frequency modulated emission spectrum signal; and/or
 wherein said assembly comprises at least three sensor nodes not aligned with one another.

19. An offshore platform comprising an anti-collision assembly according to claim 15.

20. A factory plant comprising an anti-collision assembly according to claim 15.

* * * * *